(12) United States Patent
Choi

(10) Patent No.: US 10,415,532 B2
(45) Date of Patent: Sep. 17, 2019

(54) INTEGRATED STARTER AND GENERATOR SYSTEM OF VEHICLE

(71) Applicants: HYUNDAI MOTOR COMPANY, Seoul (KR); KIA MOTORS CORPORATION, Seoul (KR)

(72) Inventor: Kum Lim Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/824,388

(22) Filed: Nov. 28, 2017

(65) Prior Publication Data

US 2018/0335008 A1      Nov. 22, 2018

(30) Foreign Application Priority Data

May 18, 2017   (KR) .................. 10-2017-0061396

(51) Int. Cl.
| | |
|---|---|
| *F02N 11/04* | (2006.01) |
| *F02N 15/04* | (2006.01) |
| *F16H 37/02* | (2006.01) |
| *H02K 7/18* | (2006.01) |
| *H02K 7/116* | (2006.01) |
| *B60K 6/48* | (2007.10) |

(52) U.S. Cl.
CPC ............ *F02N 15/046* (2013.01); *F02N 11/04* (2013.01); *F16H 37/02* (2013.01); *H02K 7/116* (2013.01); *H02K 7/1815* (2013.01); *B60K 6/48* (2013.01); *B60Y 2200/92* (2013.01); *Y10S 903/903* (2013.01)

(58) Field of Classification Search
CPC ........ F02N 15/046; F02N 11/04; F02N 15/04; H02K 7/1815; H02K 7/116; F16H 37/02; F16H 3/74; Y10S 903/903; B60Y 2200/92; B60K 6/48
See application file for complete search history.

(56) References Cited

U.S. PATENT DOCUMENTS

| | | | |
|---|---|---|---|
| 5,968,113 A | 10/1999 | Haley et al. | |
| 6,397,808 B1 * | 6/2002 | Tanaka ................... | F02N 11/04 123/179.25 |
| 8,251,164 B2 * | 8/2012 | McGee ................... | F02N 15/02 180/65.21 |
| 8,757,119 B2 * | 6/2014 | Suzuki .................... | B60K 6/00 123/179.25 |

(Continued)

FOREIGN PATENT DOCUMENTS

| | | |
|---|---|---|
| JP | 5968113 B2 | 8/2016 |
| JP | 2017-002738 A | 1/2017 |

*Primary Examiner* — David J Hlavka
(74) *Attorney, Agent, or Firm* — Morgan, Lewis & Bockius LLP

(57) ABSTRACT

An integrated starter and generator (ISG) system of a vehicle includes: a planetary gear set including a sun gear, a planet carrier, and a ring gear as rotation elements of the planetary gear set; and an integrated starter and generator (ISG) functioning as a motor and a generator, and including a stator and a rotor. The planetary gear set and the ISG are disposed in a crankshaft pulley of an engine such that torque of a crankshaft of the engine is increased and is transmitted to the ISG when generating electricity and torque of the ISG is decreased and is transmitted to the crankshaft of the engine when starting.

6 Claims, 4 Drawing Sheets

(56) References Cited

U.S. PATENT DOCUMENTS

| | | | | |
|---|---|---|---|---|
| 2003/0094317 A1* | 5/2003 | Takizawa | ............... | B60K 6/365 |
| | | | | 180/53.8 |
| 2005/0132828 A1* | 6/2005 | Cilibraise | ............. | F02N 15/046 |
| | | | | 74/7 E |
| 2006/0019786 A1* | 1/2006 | Asa | ......................... | F01C 17/02 |
| | | | | 475/5 |
| 2013/0035815 A1* | 2/2013 | Ando | ..................... | B60W 10/08 |
| | | | | 701/22 |
| 2013/0338867 A1* | 12/2013 | Sato | ..................... | B60W 10/06 |
| | | | | 701/22 |
| 2014/0024490 A1* | 1/2014 | Bangura | ............... | F16H 37/065 |
| | | | | 477/3 |
| 2015/0275842 A1 | 10/2015 | Fujita | | |

* cited by examiner

INTEGRATED STARTER AND GENERATOR SYSTEM OF VEHICLE

CROSS-REFERENCE TO RELATED APPLICATION

This application claims the benefit of priority to Korean Patent Application No. 10-2017-0061396 filed in the Korean Intellectual Property Office on May 18, 2017, the entire content of which is incorporated herein by reference.

TECHNICAL FIELD

The present disclosure relates to an integrated starter and generator (ISG) system of a vehicle. More particularly, the present disclosure relates to an ISG system of a vehicle that improves power delivery efficiency and reduces torque capacity of an ISG by mounting the ISG on a crankshaft pulley of an engine.

BACKGROUND

Environmentally-friendly technique of vehicles is a core technique on which future of vehicle industry depends. Vehicle makers devote their total energy to develop environmentally-friendly vehicles in order to meet environmental and fuel consumption regulations.

Therefore, each vehicle maker has developed electric vehicles (EVs), hybrid electric vehicles (HEVs), fuel cell electric vehicles (FCEVs) as future vehicles.

Since future vehicles have technical limitations such as weight and cost, vehicle makers pay attention to hybrid electric vehicles as alternatives to meet emission regulations and improve fuel consumption performance and fiercely compete to put hybrid electric vehicles to practical use.

A hybrid vehicle uses two or more power sources, and two or more power sources can be combined in various ways. A gasoline engine or a diesel engine using a conventional fossil fuel and a motor/generator driven by electrical energy can be used as the energy sources.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

An integrated starter and generator (ISG) functions as a motor and a generator. That is, the ISG functions as a motor to rotate a crankshaft when starting an engine, and converts torque of the engine into electrical energy and charges a battery while the engine operates. The ISG can be applied in all the vehicles provided with the engine as well as hybrid electric vehicles.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an integrated starter and generator (ISG) system of a vehicle having advantages of improving power delivery efficiency and reducing torque capacity of an ISG by directly mounting the ISG on a crankshaft pulley of an engine (i.e., directly connecting the ISG to a crankshaft).

An integrated starter and generator (ISG) system of a vehicle according to an exemplary embodiment of the present disclosure may include: a planetary gear set including a sun gear, a planet carrier and a ring gear as rotation elements thereof; an integrated starter and generator (ISG) functioning as a motor and a generator, and including a stator and a rotor, wherein the planetary gear set and the ISG are disposed in a crankshaft pulley of an engine and are operably connected with each other such that torque of a crankshaft of the engine is increased and is transmitted to the ISG when generating electricity and torque of the ISG is decreased and is transmitted to the crankshaft of the engine when starting.

The sun gear may be directly connected to the rotor, the planet carrier may be directly connected to the crankshaft pulley directly connected to the crankshaft, and the ring gear may be directly connected to the stator and be fixed to the engine.

The ring gear of the planetary gear set and the stator may be fixed by a fixing belt connecting a ring gear pulley fixed to an external circumference of the stator to a fixing pulley fixed to the engine.

An integrated starter and generator (ISG) system of a vehicle according to another exemplary embodiment of the present disclosure may include: a planetary gear set including a sun gear, a planet carrier and a ring gear as rotation elements thereof; an integrated starter and generator (ISG) functioning as a motor and a generator, and including a stator and a rotor, wherein the sun gear is directly connected to the rotor, the planet carrier is directly connected to a crankshaft pulley directly connected to a crankshaft, and the ring gear is directly connected to the stator and is fixed to an engine such that torque of the crankshaft of the engine is increased and is transmitted to the ISG when generating electricity and torque of the ISG is decreased and is transmitted to the crankshaft of the engine.

The planetary gear set and the ISG may be disposed in the crankshaft pulley of the engine.

The ring gear of the planetary gear set may be fixed by a fixing belt connecting a ring gear pulley fixed to an external circumference of the stator to a fixing pulley fixed to the engine.

The planetary gear set may be a single pinion planetary gear set.

According to an exemplary embodiment of the present disclosure, an ISG as well as a planetary gear set is directly mounted on a crankshaft pulley in an ISG system of a vehicle. Therefore, increase in tension of a belt is prevented.

Since starting torque of the ISG is increased by a gear ratio when starting an engine, increase in capacity of the ISG is not necessary and cost may be curtailed.

In addition, since torque of the engine is increased and then is transmitted to the ISG, electric energy generated by the ISG may be increased compared with that generated by a conventional ISG.

In addition, since the stator of the ISG is not directly fixed to the engine block, changes of engine block structures for fixing the ISG may be minimized.

Other effects obtainable or predictable from an exemplary embodiment of the present disclosure will be explicitly or implicitly described in a DETAILED DESCRIPTION section. That is, various effects predictable from an exemplary embodiment of the present disclosure will be described in the DETAILED DESCRIPTION section.

DETAILED DESCRIPTION OF THE EMBODIMENTS

Figure 1:
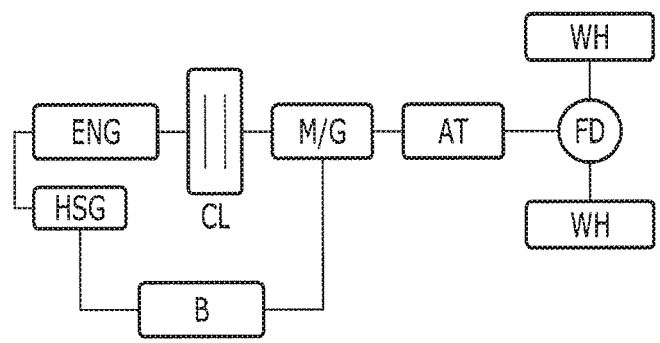
FIG. 1 is a schematic view of a power delivery system of a conventional hybrid electric vehicle to which an integrated starter and generator (ISG) according to an exemplary embodiment of the present disclosure can be applied.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

Parts which are not related with the description are omitted for clearly describing the exemplary embodiments of the present disclosure and like reference numerals refer to like or similar elements throughout the specification.

In the following description, dividing names of components into first, second and the like is to divide the names because the names of the components are the same as each other and an order thereof is not particularly limited.

FIG. 1 is a schematic view of a power delivery system of a conventional hybrid electric vehicle to which an integrated starter and generator (ISG) according to an exemplary embodiment of the present disclosure can be applied.

In FIG. 1, one example of a power delivery system of TMED (Transmission Mounted Electric Device) type in a hybrid electric vehicle of parallel type is illustrated. However, it is to be understood by a person of an ordinary skill in the art that an ISG according to an exemplary embodiment of the present disclosure can be applied to a vehicle having an engine as well as a hybrid electric vehicle shown in FIG. 1.

In the power delivery system of TMED type, a clutch CL is disposed between an engine ENG as a primary power source and a motor/generator M/G as an auxiliary power source, an automatic transmission AT for changing and outputting torque transmitted from the engine ENG and/or the motor/generator M/G is disposed at the rear of the motor/generator M/G, and a final reduction device FD for transmitting torque from the automatic transmission AT to a driving wheel WH is disposed at the rear of the automatic transmission AT.

The engine ENG is started by a hybrid starter and generator (it will hereinafter be called 'HSG') and by the motor/generator M/G when the HSG is out of order.

Both of the HSG and the motor/generator M/G function as a motor and a generator, and are configured to be electrically connected to a high-capacity battery B to receive electric power from the high-capacity battery B or to charge the high-capacity battery B.

The HSG is used as a generator for starting the engine and charging the battery, but is not used as a drive motor for the vehicle. In addition, the motor/generator M/G is used as a drive motor for the vehicle and as a generator for charging the battery.

The HSG shown in FIG. 1 is disposed at an outside of the engine block and is connected to a crankshaft pulley of the engine through a belt. The HSG shown in FIG. 1 has a merit in minimizing change of engine structures, but tension of the belt increases because a capacity of an alternator is greater than that of the HSG, thereby increasing friction resistance.

Recently, an integrated starter and generator (it will hereinafter be called 'ISG') system is developed and actually applied to a vehicle. According to the ISG system, the HSG is directly mounted on parts related to the crankshaft of the engine.

Figure 2:
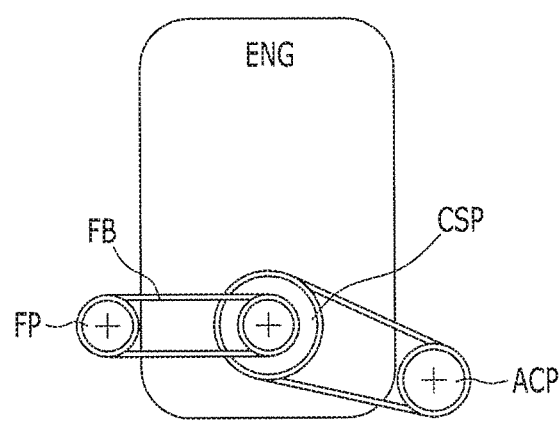
FIG. 2 shows a mounting position of an ISG system according to an exemplary embodiment of the present disclosure.

FIG. 2 is a schematic view of arrangements of pulleys for showing a mounting position of an ISG system according to an exemplary embodiment of the present disclosure.

Referring to FIG. 2, the ISG system of a hybrid electric vehicle according to an exemplary embodiment of the present disclosure is disposed on a crankshaft pulley CSP, and the crankshaft pulley CSP is connected to various accessory devices (not shown) including an air-conditioning pulley ACP through a belt.

The accessory devices include a generator, an air-conditioning, a water pump, a power steering, etc.

Figure 3:
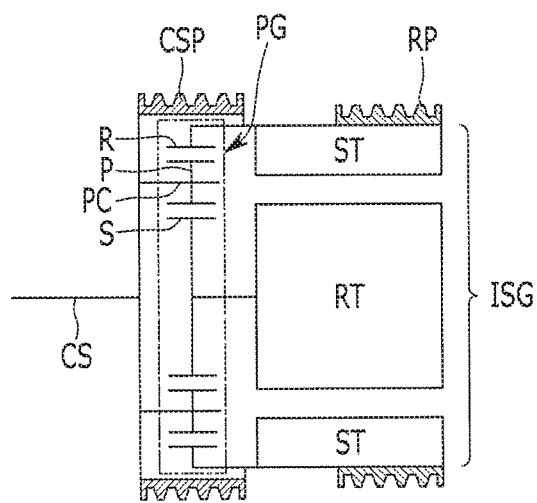
FIG. 3 is a schematic diagram of an ISG system according to an exemplary embodiment of the present disclosure.

FIG. 3 is a schematic diagram of an ISG system according to an exemplary embodiment of the present disclosure.

Referring to FIG. 3, the ISG system according to the exemplary embodiment of the present disclosure includes a planetary gear set PG as torque changing means and an ISG functioning as a motor and a generator, and is disposed on an interior circumferential portion of the crankshaft pulley CSP.

The crankshaft pulley CSP is mounted an end portion of a crankshaft CS and is connected to various accessory devices (not shown) through the belt.

The planetary gear set PG is a single pinion planetary gear set and includes a sun gear S, a planet carrier PC rotatably supporting a plurality of pinion gears P evenly disposed on and externally engaged with an exterior circumference of the sun gear S, and a ring gear R internally engaged with the plurality of pinion gears P and operably connected to the sun gear S as rotation elements thereof.

The ISG, as well known to a person of an ordinary skill in the art, functions as a motor and a generator, and includes a stator ST as a fixed member, and a rotor RT rotatably supported at a radial inside of the stator ST.

The sun gear S is directly connected to the rotor RT of the ISG, the planet carrier PC is directly connected to the crankshaft pulley CSP, and the ring gear R is directly connected to the stator ST and is operated as a fixed element in the planetary gear set PG.

In order for the ring gear R to be operated as the fixed element, a ring gear pulley RP is mounted on an external circumferential portion of the stator ST and the ring gear pulley RP, as shown in FIG. 2, is connected to a fixing pulley FP fixedly disposed at an outside of the engine through a fixing belt FB.

Figure 4:
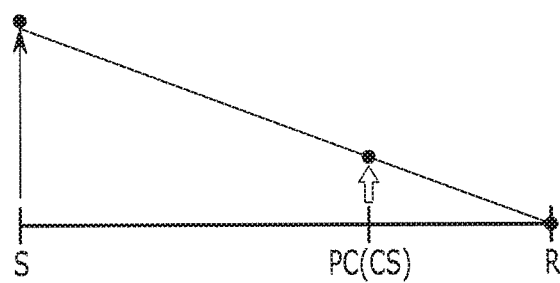
FIG. 4 is a lever diagram for showing operation of an ISG system when engine starting and when generating electric energy according to an exemplary embodiment of the present disclosure.

FIG. 4 is a lever diagram for showing operation of an ISG system when engine starting and when generating electric energy according to an exemplary embodiment of the present disclosure.

Referring to FIG. 4, as well known to a person of an ordinary skill in the art, the sun gear 5, the planet carrier PC, and the ring gear R of the planetary gear set PG are set as three nodes in a lever diagram, and a distance between the nodes is set according to teeth numbers of the sun gear S and the ring gear R.

When the engine is started, torque of the ISG is input into the sun gear S due to operation of the ISG and the ring gear R is operated as the fixed element. Therefore, a reduced rotation speed is output through the planet carrier PC that is an output element.

In this case, torque of the ISG is increased by a gear ratio and is then transmitted to the planet carrier PC, the engine ENG is started by the increased torque output through the planet carrier PC. Since maximum output of the ISG can be lowered by the gear ratio, a capacity of the ISG may be reduced and material cost may be curtailed.

When electric energy is generated due to operation of the engine ENG, the planet carrier PC directly connected to the crankshaft CS is operated as an input element and the sun gear S connected to the ISG is operated as an output element. Therefore, rotational speed of the engine ENG is increased and is then transmitted to the ISG, and electric energy is generated by the increased rotational speed.

According to the exemplary embodiment of the present disclosure, since the ISG as well as the planetary gear set is directly mounted on the crankshaft pulley, tension of the belt is not increased.

In addition, since starting torque of the ISG is increased by the gear ratio when starting the engine, capacity increase of the ISG is not necessary, thereby curtailing cost.

In addition, since the rotational speed of the engine ENG is increased and then is transmitted to the ISG when electric energy is generated, energy generation of the ISG can be increased, compared with a conventional ISG.

In addition, since the stator of the ISG is not directly fixed to an engine block, change of an engine block structure for fixing the ISG may be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An integrated starter and generator (ISG) system of a vehicle, comprising:
    a planetary gear set including a sun gear, a planet carrier, and a ring gear as rotation elements of the planetary gear set; and
    an integrated starter and generator (ISG) functioning as a motor and a generator, and including a stator and a rotor,
    wherein the planetary gear set and the ISG are disposed in a crankshaft pulley of an engine and are operably connected with each other such that torque of a crankshaft of the engine is increased and is transmitted to the ISG when generating electricity and torque of the ISG is decreased and is transmitted, to the crankshaft of the engine when starting, and
    wherein the sun gear is directly connected to the rotor, the planet carrier is directly connected to the crankshaft pulley directly connected to the crankshaft, and the ring gear is directly connected to the stator and is fixed to the engine.

2. The ISG system of claim 1, wherein the ring gear of the planetary gear set and the stator are fixed by a fixing belt connecting a ring gear pulley fixed to an external circumference of the stator to a fixing pulley fixed to the engine.

3. An integrated starter and generator (ISG) system of a vehicle, comprising:
    a planetary gear set including a sun gear, a planet carrier and a ring gear as rotation elements of the planetary gear set; and
    an integrated starter and generator (ISG) functioning as a motor and a generator, and including a stator and a rotor,
    wherein the sun gear is directly connected to the rotor, the planet carrier is directly connected to a crankshaft pulley directly connected to a crankshaft, and the ring gear is directly connected to the stator and is fixed to an engine such that torque of the crankshaft of the engine is increased and is transmitted to the ISG when generating electricity and torque of the ISG is decreased and is transmitted to the crankshaft of the engine.

4. The ISG system of claim 3, wherein the planetary gear set and the ISG are disposed in the crankshaft pulley of the engine.

5. The ISG system of claim 3, wherein the ring gear of the planetary gear set is fixed by a fixing belt connecting a ring gear pulley fixed to an external circumference of the stator to a fixing pulley fixed to the engine.

6. The ISG system of claim 3, wherein the planetary gear set is a single pinion planetary gear set.

* * * * *